April 6, 1948. W. J. HUDSON 2,439,342
PRESSURE MEASURING APPARATUS
Filed Feb. 23, 1944

INVENTOR
William J. Hudson
BY
David A. Fox
ATTORNEY

Patented Apr. 6, 1948

2,439,342

UNITED STATES PATENT OFFICE 2,439,342

PRESSURE MEASURING APPARATUS

William J. Hudson, Milwaukee, Wis.

Application February 23, 1944, Serial No. 523,778

8 Claims. (Cl. 73—403)

This invention relates to pressure measuring apparatus and resides in an improved construction thereof in which a movable member immersed in a liquid is adapted to assume an equilibrium position of buoyant suspension corresponding to the pressure prevailing.

The apparatus of this invention is well adapted for use as a barometer by which the atmospheric pressure and the variations therein may be measured, but it is also adapted for the measurement of pressures other than atmospheric pressure.

The apparatus of this invention furthermore is adapted for easy and simple correction or compensation for variations in response due to thermometric effects, and therefore is capable of precision even though of very simple and economical construction.

This invention is herein described by reference to specific instances of its embodiment and use, the same being set forth by way of illustration and not of limitation. In describing the invention, reference is had to the drawing which forms a part hereof and in which.

Figure 1:
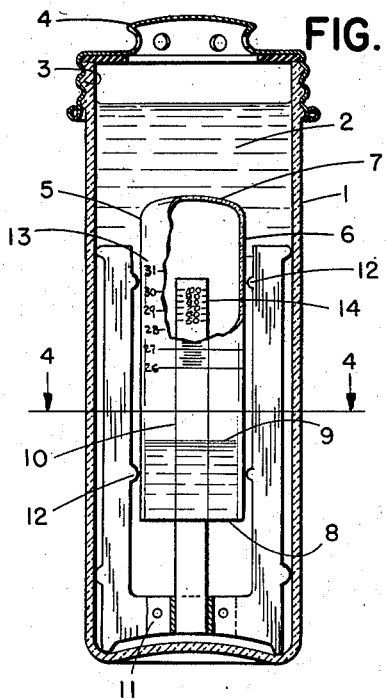
Fig. 1 is a front view in elevation and in section of one form of the pressure measuring apparatus of this invention.

Referring now to Fig. 1, the form of apparatus of this invention there shown is provided with a transparent external container 1 for holding a body of liquid 2. The container 1 is provided with a threaded upper end 3 closed by a perforate cap 4 for the purpose of excluding foreign matter but of admitting the atmosphere so that it may act upon the surface of the body of liquid 2. In this form the apparatus is adapted to act as a barometer, but if desired the threaded end 3 of the container 1 may be joined with a chamber or system closed to the atmosphere, the internal pressure of which is to be measured.

The liquid 2 is preferably chosen from among those substances having a very low vapor pressure and furthermore being incapable of dissolving substantial quantities of air. For this purpose an appropriate petroleum fraction may be employed, such for example as is employed for sealing rotary vacuum pumps and the like. The liquid 2 furthermore is preferably transparent for a purpose which will be apparent from the description following. In cases where greater permanency in response is not required, ordinary water may be employed for the liquid 2, since evaporation which takes place may be readily replaced without disturbing the sensitive element of the apparatus.

Submerged within the liquid 2 and freely and buoyantly suspended therein is an inverted hollow member 5 having closed sides 6 and a closed top 7 so as to trap a predetermined volume of gas therein. The bottom 8 of the hollow member 5 is open, permitting the liquid 2 to freely enter and to attain a position of equilibrium therein represented by the liquid surface 9.

Extending upwardly within the hollow member 5 is a space occupying equilibrium restoring body 10 rigidly fixed at its lower end in a guiding frame 11. The guiding frame 11, composed of metal or other suitable material, in turn engages the internal walls of the container 1 in stationary relationship therewith, thus providing a positive support for the space occupying body 10 and providing guiding means for the hollow member 5 which is free to move vertically without contact with the inwardly extending points 12 except in case of misalignment. In this way the hollow member 5 may move with great ease free of friction and capillary effects.

Movement of the hollow member 5 in response to variations in pressure impressed upon the surface of liquid 2 is the result of two oppositely effective actions. Upon an increase in pressure imposed upon the liquid 2, the surface 9 moves toward the top 7 of the hollow member 5 since the trapped gas contained within the hollow member 5 must contract in response to the augmented pressure. When this occurs, the net displacement of the hollow member 5 is reduced and it starts to move downwardly. As this downward movement takes place, an increase in the amount of volume of the equilibrium restoring body 10 exposed above the liquid level 9 takes place. Since the exposed volume of the body 10 is a part of the net displacement of the hollow member 5, a new position of equilibrium is reached as soon as the increase in exposure of the body 10 equals the decrease in the volume of trapped gas. Upon diminution of pressure applied to the surface of liquid 2, an exactly opposite effect takes place with the result that the hollow member 5 moves upwardly to a new position of equilibrium. The hollow member 5 will therefor assume a different equilibrium position for each different pressure applied to the surface of liquid 2.

In order to take advantage of the alteration in the equilibrium position of the hollow member 5 for the purpose of measuring pressure changes, the hollow member 5 is preferably made of transparent glass and is provided with a graduated scale 13 as shown. As an indicator against which the scale 13 may be read, the equilibrium restoring body 10 or if desired any other stationary part of the apparatus is provided with a series of reference marks 14, the same being related to the temperatures at which said reference marks are approximately valid and being labeled in terms of temperature accordingly. Thus in reading the instrument, the observer first ascertains the temperature prevailing in the liquid 2, selects the appropriate reference mark in the series of marks 14 and relates this to the position on the scale 13 corresponding thereto to obtain a pressure reading corrected for ambient temperature.

The positioning of the reference marks 14 is arrived at by determining the amount of vertical displacement caused by predetermined temperature changes at a constant pressure selected to be approximately in the center of the range of indication desired. This may be done analytically from the known thermometric properties of gases or by actual calibration under known condition. When pressures are at the extreme upper end of the indicating range, such temperature correction will be slightly excessive, and when pressures are at the opposite end of the range the correction will be slightly inadequate; but the discrepancy in any case will be so minute as to be negligible for all ordinary uses to which a barometer may be put.

The sensitivity of the apparatus may be predetermined as desired by selecting the proper ratio of cross-sectional area of the hollow member 5 and the equilibrium restoring body 10. When this ratio is large, sensitivity is high.

Figure 2:
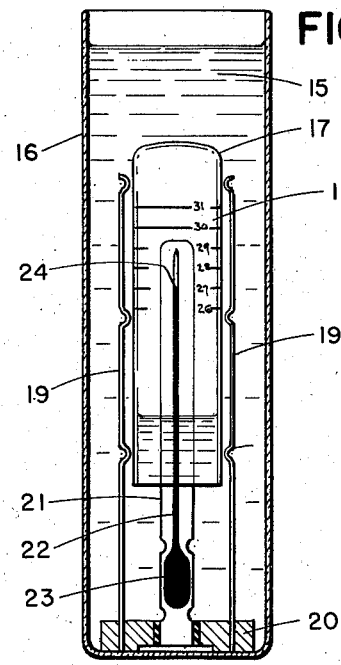
Fig. 2 is a front view in elevation and in section showing another form of the apparatus of this invention provided with self-contained temperature compensating means.

Another form of the apparatus of this invention appears in Fig. 2 in which a body of liquid 15 is held within a vessel 16 and surrounds a buoyantly suspended hollow member 17 provided with a graduated scale 18. The hollow member 17 is guided as in the case of the hollow member 5 shown in Fig. 1 by spaced guiding wires 19 which do not touch the hollow member 17 except in case of misalignment. The wires 19 are held in a base 20 which also furnished support for a space occupying equilibrium restoring body 21 formed integrally with a thermometer having a column 22 and a thermometer bulb 23. The column 22 is held within a bore communicating with the bulb 23, the same being filled to the proper level with an appropriate thermometric fluid. The upper surface 24 of said liquid forms a reference mark against which the scale 18 may be read. The response of the surface 24 of the thermometric fluid is related to the thermometric response of the gas trapped within the hollow member 17 so as to compensate therefor in the manner heretofore described in the case of scale 14 and thus pressure impressed upon the surface of liquid 15 may be read directly from the scale 18 without need of ascertaining the temperature prevailing.

Figure 3:
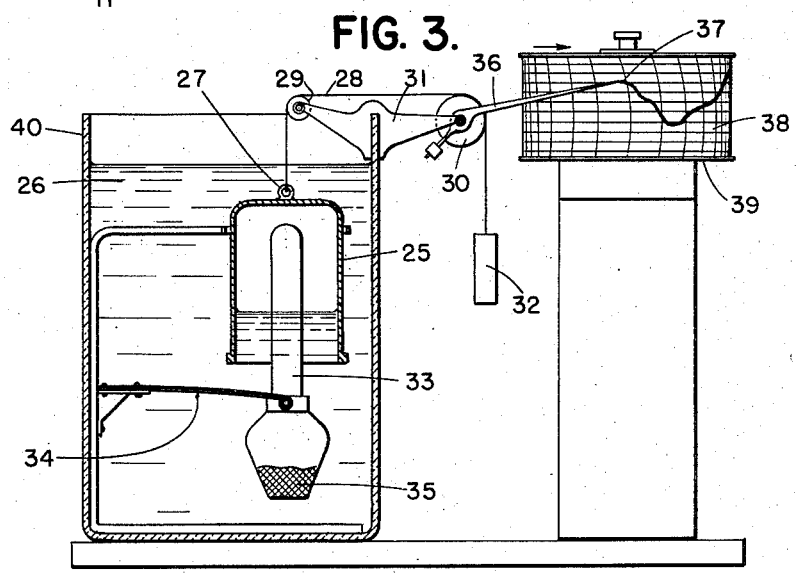
Fig. 3 is a front view in elevation and partly in section of a form of the apparatus of this invention adapted to record pressure variations.
Figure 4:
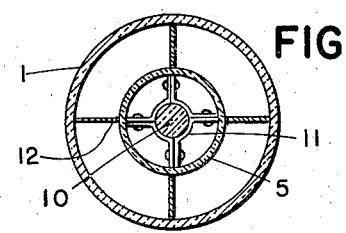
Fig. 4 is a top plan view in section viewed through the plane 4—4 indicated in Fig. 1.

Another form of the apparatus of this invention appearing in Fig. 3 is provided with a hollow member 25 inverted within a body of liquid 26 held within a container 40. Extending upwardly from a ring 27, and affixed to the hollow member 25 is a flexible strand 28 which passes over a freely turning sheave 29 and a freely turning sheave 30, both carried in a bracket 31 mounted upon the container 40. The opposite end of strand 28 is secured to a loading weight 32. The weight of the hollow member 25 and of the loading weight 32 are related to the volume of trapped gas held within the hollow member 25 in such fashion that the hollow member 25 assumes an equilibrium position of buoyant suspension beneath the surface of liquid 26 as shown.

Extending upwardly within the hollow member 25 is an equilibrium restoring space occupying body 33 carried upon a mounting arm 34. The mounting arm 34 is preferably formed of a thermally responsive bi-metallic strip so positioned that the outer end of the same forms an attachment with the body 33 which will move downwardly upon an increase in temperature and will move upwardly upon a decrease in temperature, the amount of said movement being proportionate to the thermometric change of volume of trapped gas contained within the hollow member 25 to compensate therefor. The equilibrium restoring volume occupying body 33 is preferably formed of glass and is hollow and is ballasted by means of ballasting material 35 so as to cause it to maintain an upright position at all times and furthermore the amount of ballast 35 is so chosen as to render the weight and buoyancy of the body 33 very nearly equal so as to impose a minimum of loading upon the temperature responsive arm 34.

Secured to the sheave 30 to rotate therewith is a counter-balanced pen arm 36 carrying a pen 37 positioned to engage a replaceable paper recording chart 38 mounted upon a drum 39 driven by a clock of any conventional well known form not shown. This form of the apparatus thus arranged furnishes a simple and effective barograph or recording barometer, but it is obvious that it also may be arranged to record pressure changes within an environment other than the atmosphere.

I claim:

1. In an apparatus for measuring variations in pressure the combination comprising means containing a body of liquid adapted to be put in contact with and subject to the pressure of a medium to be measured, an inverted hollow member immersed in said liquid, said hollow member having closed sides and a closed top capable of trapping gas to cause said hollow member to assume a position of buoyant equilibrium, said hollow member also having an opening beneath said trapped gas through which said liquid may pass to vary the volume of said trapped gas in response to pressure variations in said liquid, equilibrium restoring space occupying means cooperatively associated with said hollow member and adapted to cause the volume of liquid displaced thereby to increase during downward movement thereof to provide a separate position of equilibrium of said hollow member for each pressure prevailing in said liquid, and measuring means associated with said hollow member and adapted to measure vertical displacement thereof.

2. In an apparatus for measuring variations in pressure the combination comprising means containing a body of liquid adapted to be put in contact with and subject to the pressure of a medium to be measured, an inverted hollow member submerged in said liquid, said hollow member having closed sides and a closed top capable of trapping gas to cause said hollow member to assume a position of buoyant equilibrium, said hollow member also having a downwardly facing opening beneath said trapped gas through which said liquid may pass to vary the volume of said trapped gas in response to pressure variations in said liquid, an equilibrium restoring space occupying means mounted within said liquid and extending upwardly through said opening in said hollow member adapted to cause the volume of liquid displaced by said hollow member to increase during downward movement thereof to provide a separate position of equilibrium of said hollow member for each pressure prevailing in said liquid, and measuring means associated with said hollow member and adapted to measure vertical displacement thereof.

3. In an apparatus for measuring variations in pressure the combination comprising means containing a body of liquid adapted to be put in contact with and subject to the pressure of a medium to be measured, an inverted hollow member submerged in said liquid, said hollow member having closed sides and a closed top capable of trapping gas to cause said hollow member to assume a position of buoyant equilibrium, said hollow member also having a downwardly facing opening beneath said trapped gas through which said liquid may pass to vary the volume of said trapped gas in response to pressure variations in said liquid, an equilibrium restoring space occupying means mounted within said liquid to move vertically therein in response to temperature changes and extending upwardly through said opening in said hollow member and adapted to cause the volume of liquid displaced by said hollow member to increase during downward movement thereof to provide a separate position of equilibrium of said hollow member for each pressure prevailing in said liquid, temperature responsive means associated with said equilibrium-restoring means and the mounting therefor for causing said equilibrium-restoring means to move vertically in response to temperature changes so as to substantially offset vertical displacement of said hollow member caused by thermometric changes, and measuring means associated with said hollow member and adapted to measure vertical displacement thereof.

4. In an apparatus responsive to pressure variations the combination comprising means containing a body of liquid adapted to be put in contact with and subject to the pressure exerted by a medium to which said apparatus is to respond, a responsive hollow member submerged within said liquid adapted to trap gas and to assume a submerged position of buoyant equilibrium, said hollow member having a downwardly facing opening in free communication with said liquid, and an equilibrium restoring space occupying means positioned within said liquid and extending freely upwardly through said downwardly facing opening in said responsive hollow member and into the trapped gas contained therein.

5. In an apparatus for indicating pressure variations the combination comprising transparent means containing a body of transparent liquid adapted to be put in contact with and subject to the pressure exerted by a medium to which said apparatus is to respond, a transparent responsive hollow member submerged within said liquid adapted to trap gas and to assume a submerged position of buoyant equilibrium, said hollow member having a downwardly facing opening in free communication with said liquid, an equilibrium restoring space occupying means positioned within said liquid and extending freely upwardly through said downwardly facing opening in said responsive hollow member and into the trapped gas contained therein, a plurality of externally visible pressure measuring scale markings vertically ranged on said transparent responsive hollow member, and an externally visible indicating mark on said space occupying means referable to said pressure measuring scale markings for reading the same.

6. In an apparatus for indicating pressure variations the combination comprising transparent means containing a body of transparent liquid adapted to be put in contact with and subject to the pressure exerted by a medium to which said apparatus is to respond, a transparent responsive hollow member submerged within said liquid adapted to trap gas and to assume a submerged position of buoyant equilibrium, said hollow member having a downwardly facing opening in free communication with said liquid, an equilibrium restoring space occupying means positioned within said liquid and extending freely upwardly through said downwardly facing opening in said responsive hollow member and into the trapped gas contained therein, a plurality of externally visible pressure measuring scale markings vertically ranged on said transparent responsive hollow member, and an externally visible thermometrically responsive indicator associated with said space occupying means referable to said pressure measuring scale markings for reading the same.

7. In an apparatus responsive to pressure variations the combination comprising means containing a body of liquid adapted to be put in contact with and subject to the pressure exerted by a medium to which said apparatus is to respond, a responsive hollow member submerged within said liquid adapted to trap gas and to assume a submerged position of buoyant equilibrium, said hollow member having a downwardly facing opening in free communication with said liquid, an equilibrium restoring space occupying means positioned within said liquid and extending freely upwardly through said downwardly facing opening in said responsive hollow member and into the trapped gas contained therein, and means for altering the vertical position of said space occupying means in response to thermometric changes in direction opposite to and in amount correlative to temperature induced changes in buoyancy of said responsive hollow member.

8. In an apparatus adapted upon introduction of transparent liquid for use as a barometer the combination comprising, an open transparent container, an inverted hollow glass member having a closed upper end and an open lower end disposed in said container, guiding means for guiding said hollow member for vertical movement, a vertical glass thermometer stem including a bore a bulb and a thermometric liquid forming a column positioned within said container and extending upwardly within said hollow member, and position indicating markings on said hollow member visible from the exterior of said container and referable to the upper surface of said thermometer liquid column.

WILLIAM J. HUDSON.

REFERENCES CITED

The following references are of record in the file of this patent:

UNITED STATES PATENTS

| Number | Name | Date |
| --- | --- | --- |
| 1,928,096 | Dubrovin | Sept. 26, 1933 |

FOREIGN PATENTS

| Number | Country | Date |
| --- | --- | --- |
| 16,054 | Great Britain | Dec. 6, 1884 |